Figure 1:
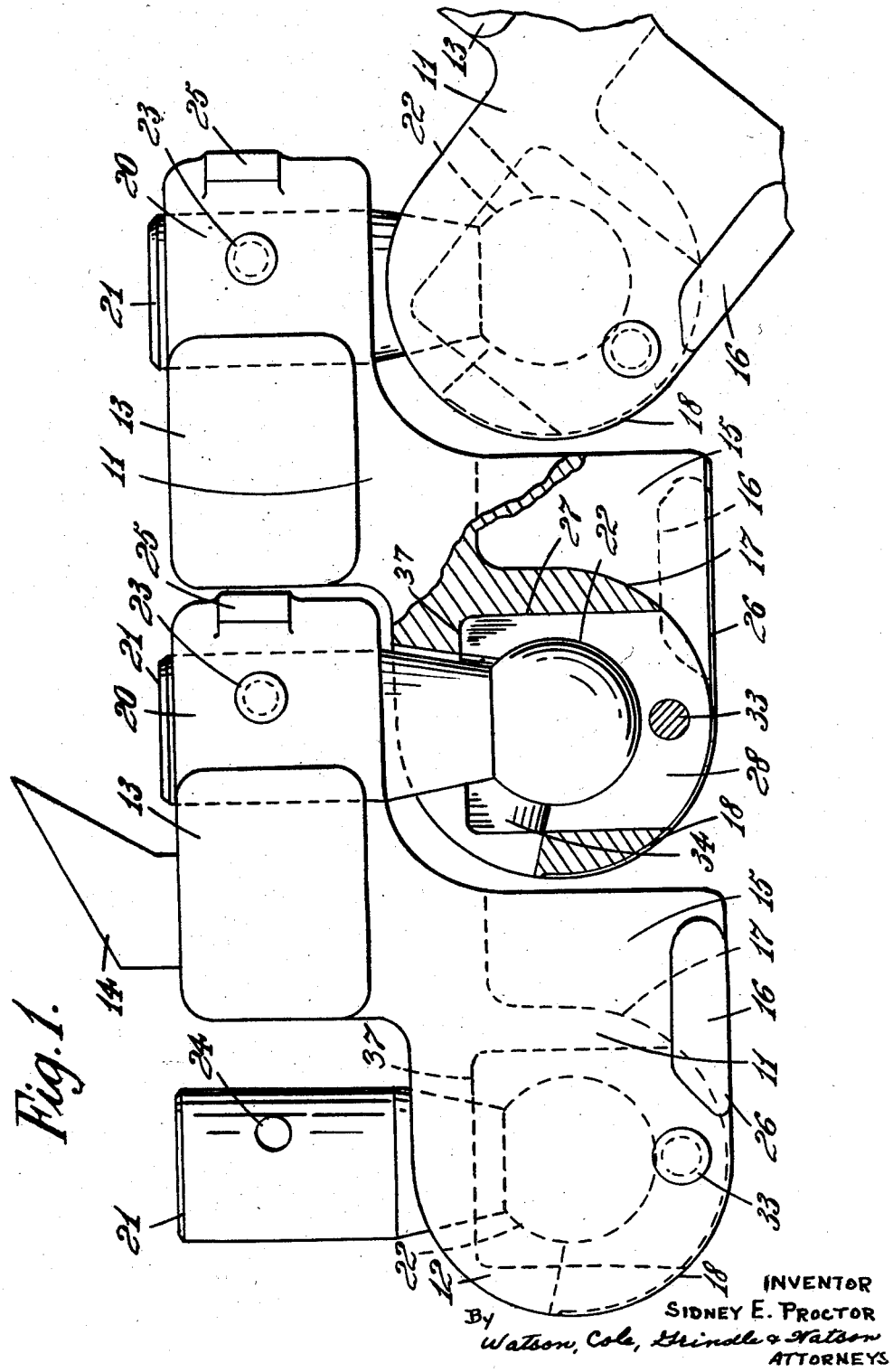

Feb. 10, 1959 S. E. PROCTOR 2,872,826
TOOL-CARRYING CHAINS
Filed April 30, 1956 2 Sheets-Sheet 1

INVENTOR
SIDNEY E. PROCTOR
By Watson, Cole, Grindle & Watson
ATTORNEYS

Feb. 10, 1959 — S. E. PROCTOR — 2,872,826
TOOL-CARRYING CHAINS
Filed April 30, 1956 — 2 Sheets-Sheet 2
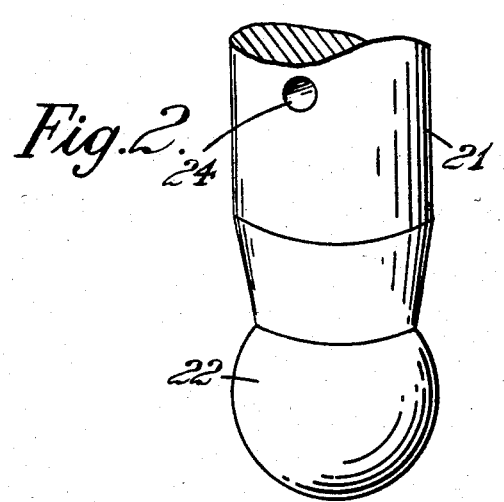
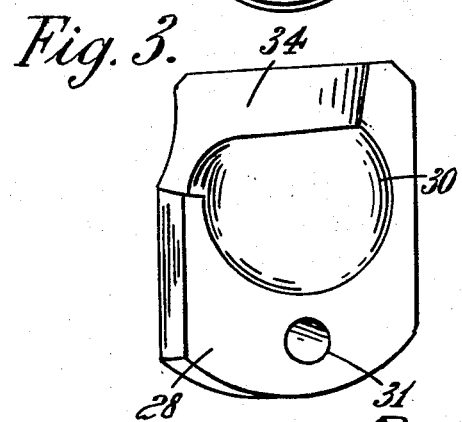
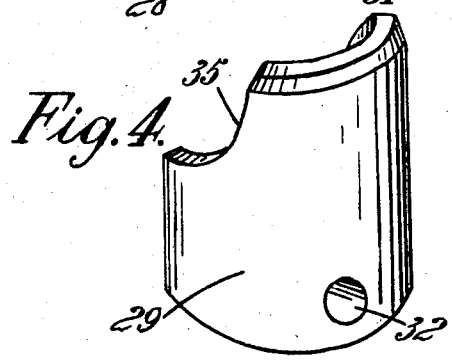
INVENTOR
SIDNEY E. PROCTOR
By Watson, Cole, Grindle & Watson
ATTORNEY

United States Patent Office 2,872,826
Patented Feb. 10, 1959

2,872,826
TOOL-CARRYING CHAINS

Sidney Ernest Proctor, Saunderton, High Wycombe, England, assignor to Austin Hoy and Company Limited, High Wycombe, England, a British company Application April 30, 1956, Serial No. 581,617
Claims priority, application Great Britain December 6, 1955

2 Claims. (Cl. 74—246)

This invention comprises improvements in tool-carrying chains.

It is an object of the invention to provide an improved construction of tool-carrying chains suitable for use in a coal-cutting machine.

Coal-cutting chains are known having ball and socket joints between the links and in some cases the socket portion of the link is bored through transversely to receive two half liners which are welded in place after the ball member has been inserted. In other cases the liners are held in place by bayonet joints. Bayonet joints however are complicated to produce, while welding makes removal and renewal of the parts difficult. In either case the socket member has to be so cut away that it is weakened sufficiently to be liable to spread open if the chain is subjected to severe strain and thus the parts tend to become loosened.

According to the present invention, in a tool-carrying chain having ball and socket joints between the links of the type in which the links carry sockets at one end and overhanging bosses at the other from which depend ball members to enter the sockets of adjoining links, the socket portion of each link is provided with a recess bored into it from the opposite face from that into which the ball stem enters, and the recess is fitted with two half liners, the ball stem being made detachable from the link in which it is held so that in assembling the chain the half liners can be placed around the ball and the stem passed through the recess with the liners assembled upon the ball and following the stem until the parts are in place, after which a rivet or other fixing means is applied to hold the liners relatively to the link. In this way, welding can be avoided, the spreading of the link at the sides of the socket is not so likely because the sides of the link are left stronger than in the case of a transverse bore and dismantling of the chain is facilitated.

The following is a description by way of example of one construction in accordance with the invention, reference being made to the accompanying drawing in which:

Figure 1 is a side elevation of a part of a chain;
Figure 2 is a detail of a ball member and stem therefor;
Figure 3 is a detail of one half of a socket seen in perspective; and
Figure 4 is a similar view of the other half of the socket.

The chain comprises a series of links 11 which are all similar to one another and they have socket portions 12 at one end and overhanging tool-carrying bosses 13 at the other. The bosses carry cutting tools in the usual way one of which is shown at 14 and it will be understood that the tools are held in place as usual by appropriate set-screws. Below the tool-carrying bosses 13 the link is extended from the socket 12 by side walls 15 and the side walls bear at their bottom edges lateral flanges 16 to run in the guides of the jib of a coal cutter. The socket members 12 are externally cylindrical and the spaces between the side walls 15 are shaped as indicated by the dotted lines 17 to form, with the outer curved walls 18 of the socket, spaces adapted to fit the teeth of a driving sprocket on the coal cutter.

The tool-carrying bosses 13 are extended as shown at 20 so that each of them overhangs the socket portion 12 of the next link and they are bored to receive the stems 21 of ball members 22 which enter the sockets. The stems 21 are removably secured in the overhanging portions 20 by rivets 23 passing through holes 24 in the stems of the ball members. The overhanging portions 20 are shown provided with abutment surfaces 25 to bear against the rear faces of the tool-carrying bosses 13 of the next link in the chain. These abutment faces are curved about the axes of the ball stems 21 so that the chain can bend sideways but they prevent it bending backwards.

Each of the sockets 12 is bored out from the base portion 26 of the link upwardly along an axis which corresponds to the axis of the ball stem 21 to form cylindrical recesses 27 having flat shoulders 37 at their ends, which shoulders form stops. Part of the link is shown broken away in the case of the central link of Figure 1 so as to show the recess and in the recess are two half liners 28, 29, shown in detail in Figures 3 and 4, and one of which is shown in place in the sectioned portion of Figure 1. The half liners are hollowed out at 30 to receive the ball member 22 and they are provided with rivet holes 31, 32 to pass a rivet 33 which holds the half liners in place. The half liners are moreover cut away as shown at 34, 35 to pass the stem 21 of the ball member 22. The cut away portion 34 extends round nearly a quadrant of the socket opening so as to permit bending of the chain as shown by the righthand link as viewed in Figure 1.

It will be appreciated that instead of the tool-carrying bosses being on the outer sides of the links as shown in the drawing, they might be on one of the side faces 15 if desired as described in U. S. application Serial No. 558,361.

I claim:

1. A tool-carrying chain comprising in combination links having bases with flanges to run in the chain guides of a coal cutter jib, which links carry sockets at one end and bosses at the other, which bosses overlie the sockets of the neighboring links, ball stems extending from the bosses toward the bases of the neighboring links and into the sockets thereof, balls on the stems which lie within the sockets, the socket portion of each such link having a bore extending from the base of the link upwards and terminating in a flat shoulder within the body of the link, two half liners divided in the plane of their axis in each bore having recesses to fit the ball therein below said shoulder, and fixing means to secure each of the two half-liners in the bore with the ends of the half-liners abutting against said flat shoulder.

2. A link for a tool carrying chain formed with an opening completely therethrough, including a cylindrical bore opening from one side of the link and terminating medially thereof, and a stem receiving slot of lesser width than said bore opening therefrom through the other side of said link, a stop shoulder being formed in said opening at the juncture of said slot and said bore, a ball and socket assembly adapted for assembly as a unit into said opening, said assembly comprising a pair of complementary axially-divided half liners axially slidably received in said bore in abutment with said stop shoulder, said liners jointly defining a ball socket having a stem opening of lesser width than the diameter of said socket, and a ball operatively received in said socket, a stem fixed to said ball and projecting through said slot.

References Cited in the file of this patent
UNITED STATES PATENTS
2,675,219   Proctor _____ Apr. 13, 1954
FOREIGN PATENTS
737,880   Great Britain _____ Oct. 5, 1955